United States Patent
Sugiyama et al.

(10) Patent No.: US 9,754,174 B2
(45) Date of Patent: Sep. 5, 2017

(54) OBJECT DETECTION APPARATUS

(71) Applicant: DENSO CORPORATION, Kariya, Aichi-pref. (JP)

(72) Inventors: Naoki Sugiyama, Obu (JP); Kunihiro Goto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/750,825

(22) Filed: Jun. 25, 2015

(65) Prior Publication Data

US 2015/0379364 A1 Dec. 31, 2015

(30) Foreign Application Priority Data

Jun. 30, 2014 (JP) ................................ 2014-134666

(51) Int. Cl.
| | |
|---|---|
| *G06K 9/66* | (2006.01) |
| *G06K 9/00* | (2006.01) |
| *G06K 9/32* | (2006.01) |
| *G06K 9/68* | (2006.01) |
| *G06T 7/70* | (2017.01) |

(52) U.S. Cl.
CPC ....... *G06K 9/00832* (2013.01); *G06K 9/3241* (2013.01); *G06K 9/68* (2013.01);
(Continued)

(58) Field of Classification Search
CPC ........ G06K 9/60; G06K 2209/01; G06K 9/80; G06K 9/20
(Continued)

(56) References Cited

U.S. PATENT DOCUMENTS

| | | | |
|---|---|---|---|
| 6,608,930 B1 * | 8/2003 | Agnihotri | ......... G06F 17/30796 382/173 |
| 6,614,930 B1 * | 9/2003 | Agnihotri | .............. G06K 9/325 382/173 |

(Continued)

FOREIGN PATENT DOCUMENTS

| | | |
|---|---|---|
| JP | 2009-059047 | 3/2009 |
| JP | 2010-224787 | 10/2010 |

OTHER PUBLICATIONS

K. Goto et al, "Pedestrian Detection and Direction Estimation by Cascade Detector with Multi—classifiers Utilizing Feature Interaction Descriptor," IEEE Intelligent Vehicles Symposium, 2011.

*Primary Examiner* — Yosef Kassa
(74) *Attorney, Agent, or Firm* — Knobbe, Martens, Olson & Bear, LLP (57) ABSTRACT

An object detection apparatus includes means for acquiring image data from an in-vehicle imaging device and means for extracting, from the image data acquired by the acquiring means, an object region which is an image region where a preset object exists. Moreover, the extracting means includes means for identifying the object region, means for measuring the processing time of the identifying means and controlling means. The identifying means includes a plurality of identifiers for identifying candidate regions for the object region. The identifiers are serially linked so as to sequentially refine the candidate regions. The controlling means controls, based on the measured processing time at a preset time point, a degree of refining the candidate regions by the identifying means after the preset time point by adjusting at least one of the linkage between the identifiers and processes to be executed by the identifiers after the preset time point.

18 Claims, 7 Drawing Sheets

(52) U.S. Cl.
CPC ...... *G06T 7/70* (2017.01); *G06T 2207/20076* (2013.01); *G06T 2207/30196* (2013.01); *G06T 2207/30252* (2013.01)

(58) Field of Classification Search
USPC ....... 382/103, 104, 108, 170, 171, 190, 209, 382/218, 278, 282; 348/113, 118, 135, 348/143
See application file for complete search history.

(56) References Cited

U.S. PATENT DOCUMENTS

| | | | | |
|---|---|---|---|---|
| 6,731,788 | B1* | 5/2004 | Agnihotri | G06F 17/30796 194/206 |
| 6,747,582 | B2* | 6/2004 | Morihara | G06F 17/2863 341/106 |
| 7,925,050 | B2* | 4/2011 | Nagaoka | G06T 7/0002 382/100 |
| 8,242,897 | B2* | 8/2012 | Aimura | G06T 7/0075 340/436 |
| 8,487,991 | B2* | 7/2013 | Zhang | G06K 9/00798 348/113 |
| 8,552,873 | B2* | 10/2013 | Liao | A61B 5/1176 180/272 |
| 8,560,200 | B2* | 10/2013 | Maruyama | G08G 1/22 180/170 |
| 8,605,947 | B2* | 12/2013 | Zhang | G06K 9/00798 348/116 |
| 8,611,585 | B2* | 12/2013 | Zhang | G06K 9/00798 382/100 |
| 2010/0209010 | A1 | 8/2010 | Kato et al. | |

* cited by examiner

OBJECT DETECTION APPARATUS

CROSS-REFERENCE TO RELATED APPLICATION

This application is based on and claims priority from Japanese Patent Application No. 2014-134666 filed on Jun. 30, 2014, the content of which is hereby incorporated by reference in its entirety into this application.

BACKGROUND

1. Technical Field

The present invention relates to object detection apparatuses that detect objects based on image data.

2. Description of the Related Art

Conventionally, there has been proposed a technique of: scanning image data through windows of a predetermined size; calculating for each window a first evaluation value which represents the probability of an object being included in the window; extracting candidate regions based on the first evaluation values calculated for the windows; calculating for each candidate region a second evaluation value which represents the probability of the object being included in the candidate region; and extracting, based on the second evaluation values calculated for the candidate regions, an image region in which the object is included (see, for example, Japanese Patent Application Publication No. JP2009059047A).

That is, the conventional technique is a technique of performing a process of detecting an object by serially linking (or connecting) plural means for detecting the object. In this case, each detecting means extracts a desired image region by comparing the first evaluation values or the second evaluation values with a preset threshold.

To realize a thorough detection, it is preferable to set the threshold for the first-stage (or earlier-stage) detecting means to a low value. However, with the low threshold, the number of the candidate regions extracted by the first-stage detecting means, i.e., the number of the candidate regions to be processed by the second-stage (or later-stage) detecting means is increased, thereby increasing the processing time. In contrast, if the threshold for the first-stage detecting means is set to a high value for the purpose of reducing the processing time, it may be difficult to realize a thorough detection. That is, there exists a trade-off between reduction in the processing time and the realization of a thorough detection.

Moreover, the number of the candidate regions extracted by the first-stage detecting means varies greatly depending on the image data inputted to the first-stage detecting means.

Furthermore, in the case of, for example, an in-vehicle system, it is necessary to obtain the processing results in real-time and thus there is a limitation on the processing time; and the processing capacity of a processor provided in the system for performing the processing task is limited. In such a case, to complete the processing task within a time limit regardless of the size of the image data, it is necessary to set the threshold for the first-stage detecting means to a high value. However, with the high threshold, there is generally caused leeway in the processing time, and the leeway is generally not effectively utilized.

SUMMARY

According to exemplary embodiments, there is provided an object detection apparatus which includes: means for acquiring image data from an in-vehicle imaging device, the in-vehicle imaging device being configured to image an environment of a vehicle and output the image data that is indicative of the imaged environment; and means for extracting an object region from the image data acquired by the acquiring means, the object region being an image region where a preset object exists. Moreover, the object region extracting means includes: means for identifying the object region, the identifying means including a plurality of identifiers for identifying candidate regions for the object region, the identifiers being serially linked so as to sequentially refine the candidate regions; means for measuring processing time of the identifying means for processing the image data acquired by the acquiring means to identify the object region; and means for controlling, based on the measured processing time at a preset time point, a degree of refining the candidate regions by the identifying means after the preset time point by adjusting at least one of the linkage between the identifiers and processes to be executed by the identifiers after the preset time point.

More particularly, the controlling means controls the degree of refining the candidate regions so that the longer the measured processing time at the preset time point, the more the degree of refining the candidate regions is increased after the preset time point.

With the above configuration, when the measured processing time at the preset time point is long and thus there is no leeway of time in executing the remaining part of the process of the identifying means after the preset time limit, it is possible to sufficiently refine the candidate regions (or reduce the number of the candidate regions) to be processed after the preset time point. As a result, it is possible to sufficiently reduce the time for executing the remaining part of the process of the identifying means after the preset time limit, thereby making it possible to complete the entire process of the identifying means within a time limit.

On the other hand, when the measured processing time at the preset time point is short and thus there is leeway of time in executing the remaining part of the process of the identifying means after the preset time limit, it is possible to increase the number of the candidate regions which remain after the preset time point. As a result, it is possible to effectively utilize the leeway of time, thereby making it possible to realize a thorough detection of the object.

To sum up, the object detection apparatus can effectively detect the object with its detection performance adapted to the detection situation (or adjusted according to whether there is leeway in the processing time).

In one embodiment, each of the identifiers of the identifying means is configured to calculate, for each of image regions inputted to the identifier, a score which represents a probability of the object existing in the image region, and identify the image region as one of the candidate regions when the calculated score is higher than a threshold. The controlling means controls the degree of refining the candidate regions by adjusting at least one of the thresholds of the identifiers to be used after the preset time point.

More particularly, the controlling means adjusts the at least one of the thresholds of the identifiers to be used after the preset time point so that the longer the measured processing time at the preset time point, the higher the at least one of the thresholds to be used after the preset time point.

In another embodiment, at least one of the identifiers of the identifying means is configured to: calculate, for each of image regions inputted to the identifier, a score which represents a probability of the object existing in the image region; register the image region, as one of the candidate regions, in a first candidate set when the calculated score is higher than a preset first threshold; register the image region, as one of the candidate regions, in a second candidate set when the calculated score is higher than a preset second threshold that is lower than the first threshold; and select one of the first and second candidate sets and output the candidate regions registered in the selected candidate set. Moreover, the preset time point is a time point at which all the registrations of the image regions in the first and second candidate sets are completed in the at least one of the identifiers. The controlling means controls the degree of refining the candidate regions by causing the at least one of the identifiers to select the first candidate set when the measured processing time at the preset time point is longer than or equal to a preset time limit and to select the second candidate set when the measured processing time at the preset time point is shorter than the preset time limit.

In yet another embodiment, the controlling means controls the degree of refining the candidate regions by adjusting the number or types of the identifiers to be used after the preset time point.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-9B. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

Figure 1:
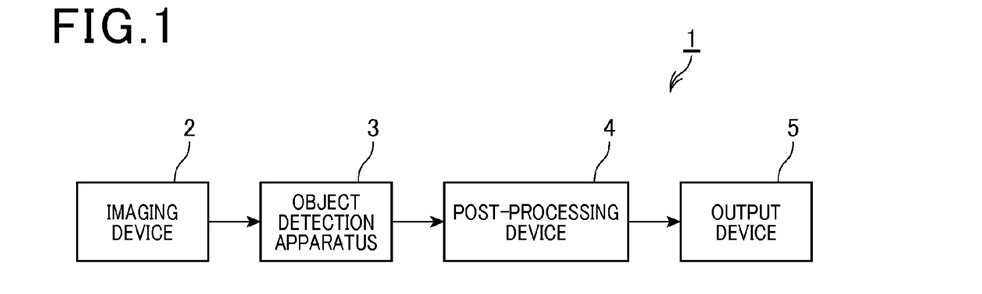
FIG. 1 is a functional block diagram illustrating the overall configuration of an in-vehicle system which includes an object detection apparatus according to a first embodiment.

FIG. 1 shows the overall configuration of an in-vehicle system 1 which includes an object detection apparatus 3 according to a first embodiment. The in-vehicle system 1 is installed in a motor vehicle.

As shown in FIG. 1, the in-vehicle system 1 further includes an imaging device 2, a post-processing device 4 and an output device 5 in addition to the object detection apparatus 3.

The imaging device 2 images (or captures images of) an environment of the vehicle (e.g., an area in front of the vehicle), and generates and outputs image data indicative of the imaged environment at predetermined time intervals.

The object detection apparatus 3 receives the image data from the imaging device 2, extracts from (or determines based on) the image data object regions which are image regions where a preset object (e.g., a pedestrian) exists, and generates and outputs object data which includes at least the positions of the object regions.

The post-processing device 4 receives the object data from the object detection apparatus 3. Then, based on the received object data, the post-processing device 4 executes a post-process that handles time-series information, such as a tracking process for tracking the object. Thereafter, the post-processing device 4 outputs the object data to which information obtained by the post-process is attached.

The output device 5 receives the object data from the post-processing device 4 and transmits, via an in-vehicle network, the object data to various in-vehicle apparatuses which perform, for example, a driving support control.

Next, the object detection apparatus 3 according to the present embodiment will be described in detail.

In the present embodiment, the object detection apparatus 3 employs a plurality of identifiers to extract the object regions from the image data.

Each of the identifiers is of a well-known type which operates as follows. First, the identifier compares dictionary data, which indicates typical examples of the object to be detected, with image regions that are obtained from the image data and have the same size as the dictionary data. Then, for each of the image regions, the identifier calculates, based on the comparison results, a score which represents the probability of the object existing in the image region, and identifies the image region as a candidate region when the calculated score is higher than a preset threshold.

In addition, hereinafter, each of the identifiers will be referred to as the ith identifier (i=1, 2, . . . , N), where N is an integer not less than 2. More particularly, in the present embodiment, N is equal to 3.

Figure 2:
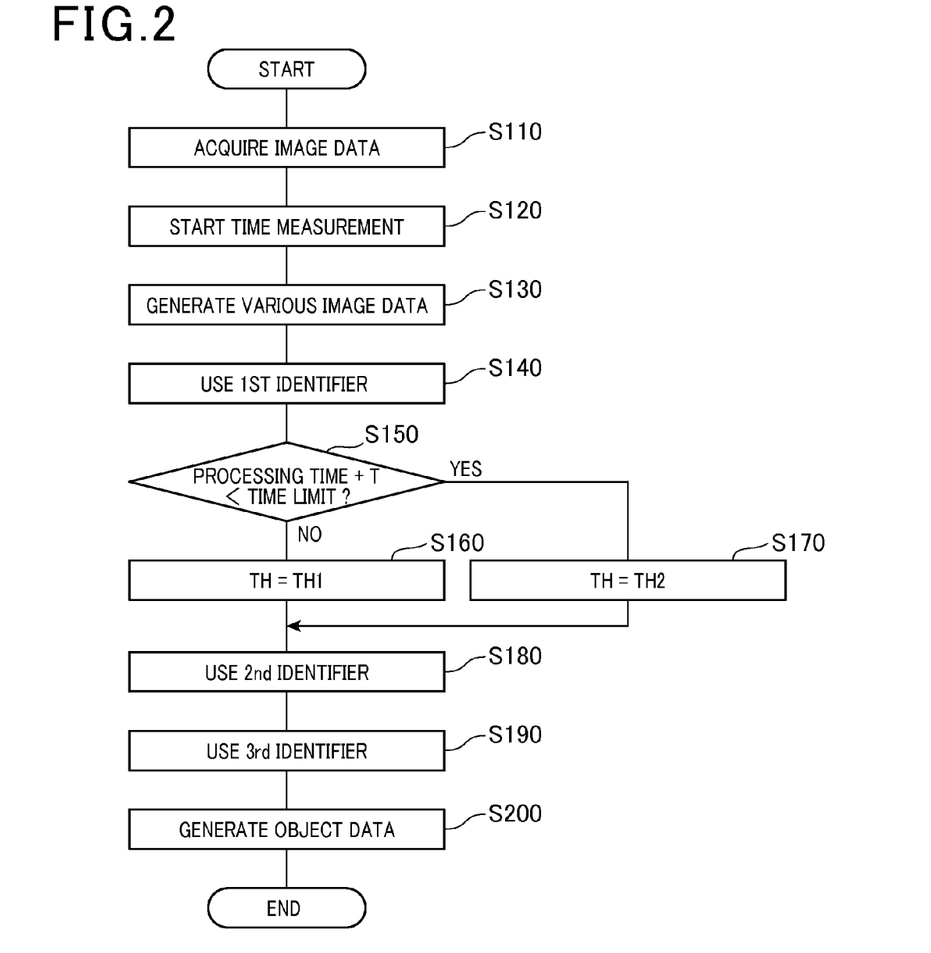
FIG. 2 is a flow chart illustrating a main process executed by the object detection apparatus according to the first embodiment.

FIG. 2 shows a main process of the object detection apparatus 3 according to the present embodiment. This process is repeated at the predetermined time intervals at which the imaging device 2 generates and outputs the image data.

Upon activation of the process, first, at step S110, the object detection apparatus 3 acquires the image data outputted from the imaging device 2.

At step S120, the object detection apparatus 3 starts measurement of the processing time.

At step S130, the object detection apparatus 3 generates, based on the image data acquired at step S110, first image data to Nth image data which are to be respectively applied to the first to the Nth identifiers.

Specifically, at this step, the object detection apparatus 3 generates the first image data to the (N−1)th image data, whose resolutions are lowered, by generating integral images by integrating pixels on the basis of the image data acquired at step S110. On the other hand, as the Nth image data, the object detection apparatus 3 directly uses the image data acquired at step S110 without any change thereto. That is, the resolution of the Nth image data is not lowered. In addition, the resolutions of the first image data to the Nth image data are set so as to successively increase in this order.

At step S140, the object detection apparatus 3 extracts candidate regions from the first image data by using the first identifier.

Specifically, at this step, the first image data is scanned through windows having the same size as the dictionary data of the first identifier. Then, for each of image regions that are obtained by dividing the first image data with the windows, the first identifier calculates a score which represents the degree of similarity of the image region to the dictionary data of the first identifier, and identifies the image region as a candidate region when the calculated degree of similarity is higher than a preset threshold TH.

At step S150, the object detection apparatus 3 determines whether a comparison time is shorter than a preset time limit. Here, the comparison time is equal to the sum of the processing time whose measurement is started at step S120 and a preset leeway time T.

If the comparison time is longer than or equal to the time limit (S150: NO), in other words, if there is no leeway in the processing time, the process proceeds to step S160.

At step S160, the object detection apparatus 3 sets a threshold TH to be used in the second identifier to a first threshold TH1. Then, the process proceeds to the step S180.

On the other hand, if the comparison time is shorter than the time limit (S150: YES), in other words, if there is leeway in the processing time, the process proceeds to step S170.

At step S170, the object detection apparatus 3 sets the threshold TH to be used in the second identifier to a second threshold TH2 that is lower than the first threshold TH1 (TH2<TH1). Then, the process proceeds to step S180.

At step S180, the object detection apparatus 3 refines the candidate regions (or reduces the number of the candidate regions) by using the second identifier to process those image regions on the second image data which respectively correspond to the candidate regions extracted by the first identifier. In addition, step S180 will be described in detail later.

At step S190, the object detection apparatus 3 further refines the candidate regions by using the third identifier to process those image regions on the third image data which respectively correspond to the candidate regions refined by the second identifier. Then, the object detection apparatus 3 identifies those candidate regions which remain after the refinement by the third identifier as the object regions in which the object exists.

At step S200, the object detection apparatus 3 generates and outputs to the post-processing device 4 the object data which contains at least information about the position of the object. Here, the position of the object is represented by the positions of the object regions identified at step S190. Then, the process goes to the end.

Figure 3:
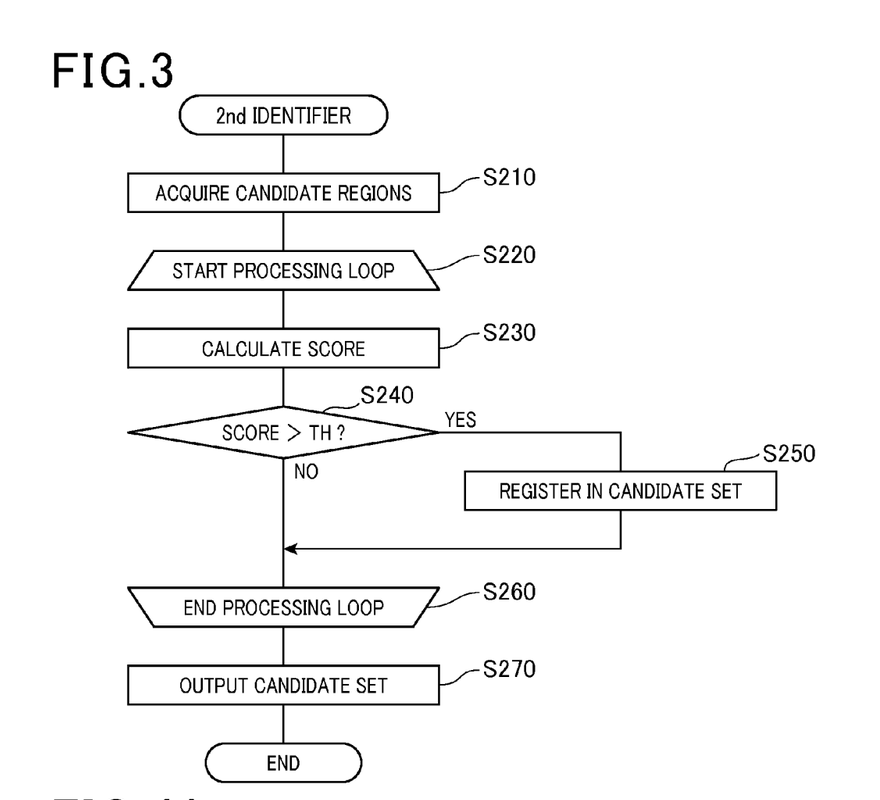
FIG. 3 is a flow chart illustrating a sub-process executed by a second identifier of the object detection apparatus according to the first embodiment.

FIG. 3 shows the details of step S180 of the main process shown in FIG. 2, in other words, shows a sub-process executed by the second identifier of the object detection apparatus 3 according to the present embodiment.

Upon activation of the sub-process, first, at step S210, the second identifier acquires the candidate regions extracted (or identified) by the previous identifier (i.e., the first identifier).

Then, the second identifier executes steps S220-S260 for each of the candidate regions acquired at step S210. In other words, the second identifier repeats steps S220-S260 by the number of the candidate regions acquired at step S210.

Specifically, at step S220, the second identifier selects one of the candidate regions acquired at step S210. That is, the second identifier starts the loop for processing the candidate regions acquired at step S210.

At step S230, for that one of the image regions on the second image data which corresponds to the candidate region selected at step S220, the second identifier calculates a score which represents the degree of similarity of the image region to the dictionary data of the second identifier.

At step S240, the second identifier determines whether the score calculated at step S230 is higher than the threshold TH. In addition, the threshold TH has been set either to the first threshold TH1 at step S160 or to the second threshold TH2 at step S170 of the main process shown in FIG. 2.

If the score is higher than the threshold TH (S240: YES), the sub-process proceeds to step S250.

At step S250, the second identifier registers the image region on the second image data in a candidate set. Then, the sub-process proceeds to step S260.

On the other hand, if the score is lower than or equal to the threshold TH (S240: NO), the sub-process directly proceeds to step S260 skipping step S250.

At step S260, the second identifier determines whether steps S230-S250 have been executed for all the candidate regions acquired at step S210. If the determination results in a "NO" answer, the sub-process returns to step S220. In contrast, if the determination results in a "YES" answer, the sub-process proceeds to step S270. That is, the second identifier ends the loop for processing the candidate regions acquired at step S210.

At step S270, the second identifier outputs, as the candidate regions refined by the second identifier, the image regions registered in the candidate set at step S250 to the next identifier (i.e., the third identifier). Then, the sub-process goes to the end.

In addition, the sub-processes (i.e., steps S140 and S190) executed by the first and third identifiers are identical to the above-described sub-process executed by the second identifier except that: the dictionary data of the first and third identifiers are different from the dictionary data of the second identifier; and the thresholds TH used in the sub-processes executed by the first and third identifiers are fixed values whereas the threshold TH used in the sub-process executed by the second identifier is a value selected between the first and second thresholds TH1 and TH2.

The above-described object detection apparatus 3 according to the present embodiment has the following advantages.

In the present embodiment, the object detection apparatus 3 sets a time point of determination to the time point at which the sub-process (i.e., step S140) executed by the first identifier is completed. The object detection apparatus 3 determines, based on the processing time at the time point of determination, whether or not there is leeway of time in executing the remaining part of the main process after the time point of determination. When the result of the determination is negative, the object detection apparatus 3 sets the threshold TH to be used in the second identifier to the first threshold TH1. In contrast, when the result of the determination is positive, the object detection apparatus 3 sets the threshold TH to be used in the second identifier to the second threshold TH2 that is lower than the first threshold TH1.

Figure 4A:
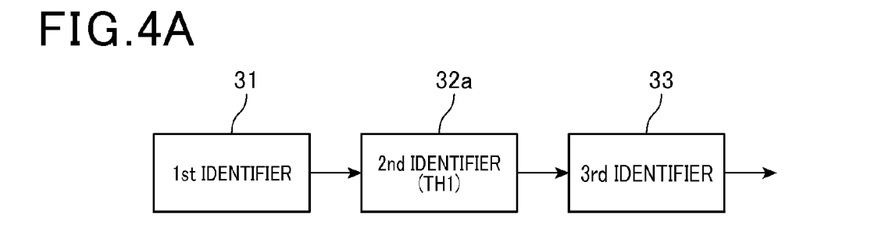
FIG. 4A is a schematic diagram illustrating the linkage established between identifiers of the object detection apparatus according to the first embodiment when there is no leeway in the processing time.

With the above configuration, when there is no leeway of time in executing the remaining part of the main process after the time point of determination, the main process is executed in a manner as illustrated in FIG. 4A, where the first threshold TH1 is used in the second identifier 32a to refine the candidate regions. Consequently, with the higher threshold TH1, it is possible to sufficiently refine the candidate regions (or reduce the number of the candidate regions) by the second identifier 32a. As a result, it is possible to sufficiently reduce the time for executing the remaining part of the main process after the time point of determination, thereby making it possible to complete the entire main process within a time limit.

Figure 4B:
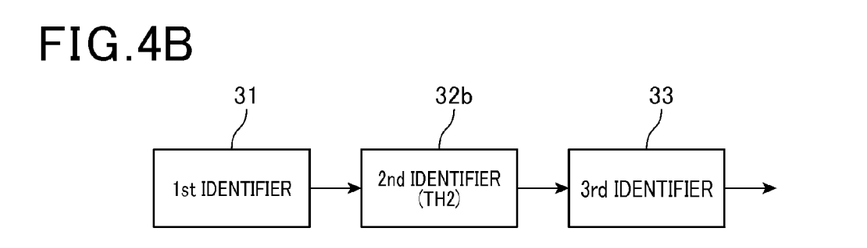
FIG. 4B is a schematic diagram illustrating the linkage established between the identifiers of the object detection apparatus according to the first embodiment when there is leeway in the processing time.

On the other hand, when there is leeway of time in executing the remaining part of the main process after the time point of determination, the main process is executed in a manner as illustrated in FIG. 4B, where the second threshold TH2 is used in the second identifier 32b to refine the candidate regions. Consequently, with the lower threshold TH2, it is possible to increase the number of the candidate regions extracted (or identified) by the second identifier 32b. As a result, it is possible to effectively utilize the leeway of time, thereby making it possible to realize a thorough detection of the object.

To sum up, the object detection apparatus 3 according to the present embodiment can effectively detect the object with its detection performance adapted to the detection situation (or adjusted according to whether there is leeway in the processing time).

In addition, in the present embodiment, step S110 of the main process of the object detection apparatus 3 may be regarded as means for acquiring the image data from the imaging device 2; and steps S120-S200 may be together regarded as means for extracting the object regions from the image data acquired from the imaging device 2. Moreover, of steps S120-S200 of the main process, steps S140, S180 and S190 may be together regarded as means for identifying the object regions; step S120 may be regarded as means for measuring the processing time; and steps S150-S170 may be together regarded as means for controlling the degree of refining the candidate regions after the time point of determination. It should be appreciated that some or all of the above means may also be implemented in other manners, for example by a dedicated circuit.

[Second Embodiment]

This embodiment illustrates an object detection apparatus 3 which has almost the same configuration as the object detection apparatus 3 according to the first embodiment; accordingly, only the differences therebetween will be described hereinafter.

In the first embodiment, as described previously, the time point of determination, at which the object detection apparatus 3 determines whether there is leeway in the processing time, is set to the time point at which the sub-process executed by the first identifier is completed. That is, the object detection apparatus 3 determines whether there is leeway in the processing time before the sub-process executed by the second identifier.

In comparison, in the present embodiment, the object detection apparatus 3 determines whether there is leeway in the processing time during the sub-process executed by the second identifier.

Specifically, in the present embodiment, the main process executed by the object detection apparatus 3 is identical to the result of omitting steps S150-S170 from the main process described in the first embodiment with reference to FIG. 2. Moreover, the sub-process executed by the second identifier is partially different from the sub-process described in the first embodiment with reference to FIG. 3.

Figure 5:
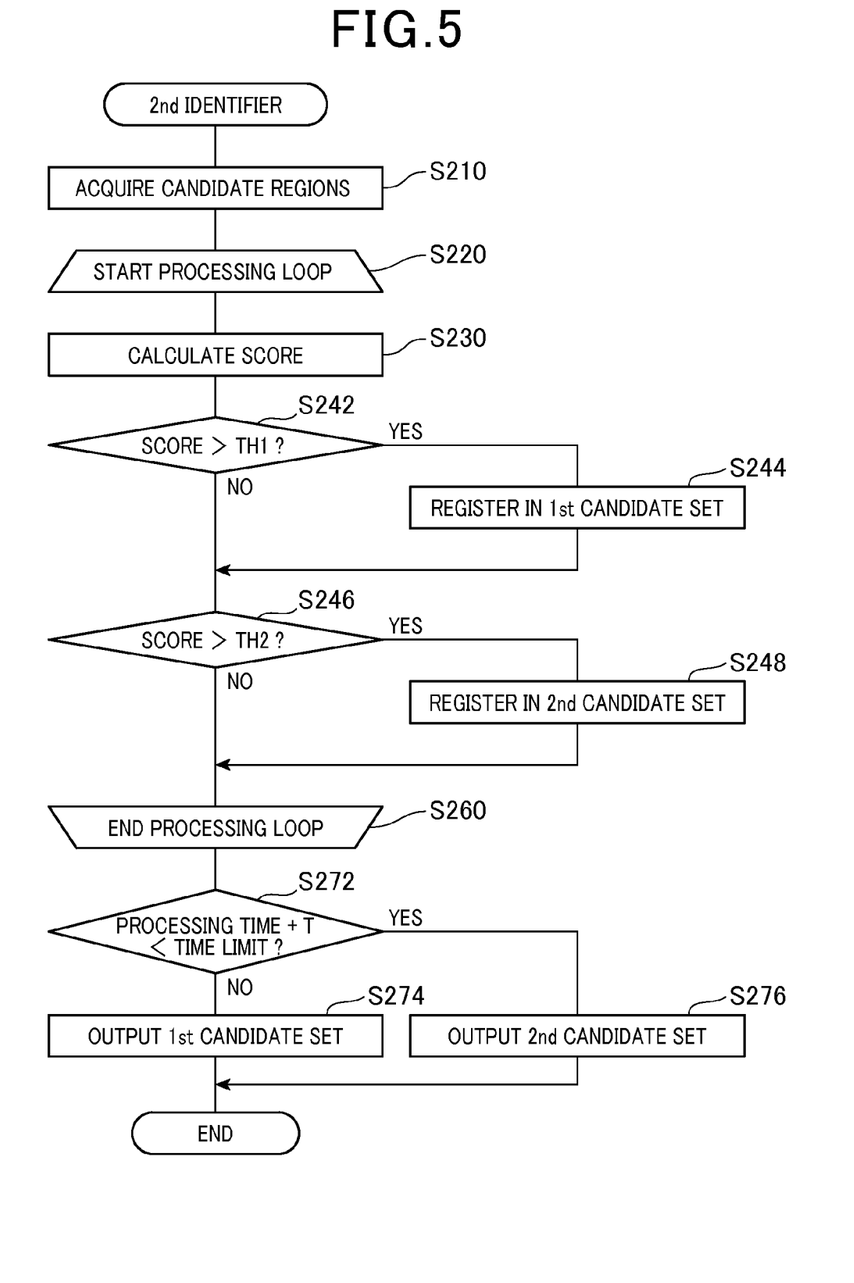
FIG. 5 is a flow chart illustrating a sub-process executed by a second identifier of an object detection apparatus according to a second embodiment.

FIG. 5 shows the sub-process executed by the second identifier of the object detection apparatus 3 according to the present embodiment.

In addition, compared to the sub-process described in the first embodiment with reference to FIG. 3, the sub-process shown in FIG. 5 includes steps S242-S248 instead of step S240-S250 and steps S272-S276 instead of step S270.

In the present embodiment, upon activation of the sub-process shown in FIG. 5, first, at step S210, the second identifier acquires the candidate regions extracted (or identified) by the previous identifier (i.e., the first identifier).

Then, the second identifier executes steps S220-S260 for each of the candidate regions acquired at step S210. In other words, the second identifier repeats steps S220-S260 by the number of the candidate regions acquired at step S210.

Specifically, at step S220, the second identifier selects one of the candidate regions acquired at step S210. That is, the second identifier starts the loop for processing the candidate regions acquired at step S210.

At step S230, for that one of the image regions on the second image data which corresponds to the candidate region selected at step S220, the second identifier calculates a score which represents the degree of similarity of the image region to the dictionary data of the second identifier.

At step S242, the second identifier determines whether the score calculated at step S230 is higher than a first threshold TH1.

If the score is higher than the first threshold TH1 (S242: YES), the process proceeds to step S244.

At step S244, the second identifier registers the image region, as a candidate region, in a first candidate set. Then, the sub-process proceeds to step S246.

On the other hand, if the score is lower than or equal to the first threshold TH1 (S242: NO), the sub-process directly proceeds to step S246 skipping step S244.

At step S246, the second identifier further determines whether the score is higher than a second threshold TH2 that is lower than the first threshold TH1 (TH2<TH1).

If the score is higher than the second threshold TH2 (S246: YES), the process proceeds to step S248.

At step S248, the second identifier registers the image region, as a candidate region, in a second candidate set. Then, the sub-process proceeds to step S260.

On the other hand, if the score is lower than or equal to the second threshold TH2 (S246: NO), the sub-process directly proceeds to step S260 skipping step S248.

At step S260, the second identifier determines whether steps S230 and S242-S248 have been executed for all the candidate regions acquired at step S210. If the determination results in a "NO" answer, the sub-process returns to step S220. In contrast, if the determination results in a "YES" answer, the sub-process proceeds to step S272. That is, the second identifier ends the loop for processing the candidate regions acquired at step S210.

At step S272, the second identifier determines whether a comparison time is shorter than a preset time limit. Here, the comparison time is equal to the sum of the processing time whose measurement is started at step S120 of the main process and a preset leeway time T.

If the comparison time is longer than or equal to the time limit (S272: NO), in other words, if there is no leeway in the processing time, the sub-process proceeds to step S274.

At step S274, the second identifier outputs, as the candidate regions refined by the second identifier, the image regions registered in the first candidate set at step S244 to the next identifier (i.e., the third identifier). Then, the sub-process goes to the end.

On the other hand, if the comparison time is shorter than the time limit (S272: YES), in other words, if there is leeway in the processing time, the sub-process proceeds to step S276.

At step S276, the second identifier outputs, as the candidate regions refined by the second identifier, the image regions registered in the second candidate set at step S248 to the next identifier (i.e., the third identifier). Then, the sub-process goes to the end.

The above-described object detection apparatus 3 according to the present embodiment has the following advantages.

In the object detection apparatus 3 according to the present embodiment, the second identifier calculates, for each of the image regions on the second image data which respectively correspond to the candidate regions outputted from the first identifier, a score which represents the degree of similarity of the image region to the dictionary data of the second identifier. Then, the second identifier registers those image regions whose scores are higher than the first threshold TH1 in the first candidate set and those image regions whose scores are higher than the second threshold TH2 in the second candidate set. Further, a time point of determination is set to the time point at which the calculation of the scores of the image regions and the registrations of the image regions in the first and second candidate sets are completed. The second identifier determines, based on the processing time at the time point of determination, whether or not there is leeway of time in executing the remaining part of the process of the object detection apparatus 3 after the time point of determination. When the result of the determination is negative, the second identifier outputs, as the candidate regions refined by the second identifier, the image regions registered in the first candidate set to the third identifier. In contrast, when the result of the determination is positive, the second identifier outputs, as the candidate regions refined by the second identifier, the image regions registered in the second candidate set to the third identifier.

With the above configuration, when there is no leeway of time in executing the remaining part of the process of the object detection apparatus 3 after the time point of determination, the process is executed in the manner as illustrated in FIG. 4A, where the first threshold TH1 is used in the second identifier 32a to refine the candidate regions. Consequently, with the higher threshold TH1, it is possible to sufficiently refine the candidate regions (or reduce the number of the candidate regions) by the second identifier 32a. As a result, it is possible to sufficiently reduce the time for executing the remaining part of the process after the time point of determination, thereby making it possible to complete the entire process of the object detection apparatus 3 within a time limit.

On the other hand, when there is leeway of time in executing the remaining part of the process of the object detection apparatus 3 after the time point of determination, the process is executed in the manner as illustrated in FIG. 4B, where the second threshold TH2 is used in the second identifier 32b to refine the candidate regions. Consequently, with the lower threshold TH2, it is possible to increase the number of the candidate regions extracted (or identified) by the second identifier 32b. As a result, it is possible to effectively utilize the leeway of time, thereby making it possible to realize a thorough detection of the object.

To sum up, the object detection apparatus 3 according to the present embodiment can effectively detect the object with its detection performance adapted to the detection situation (or adjusted according to whether there is leeway in the processing time).

In addition, in the present embodiment, steps S272-S276 of the sub-process executed by the second identifier of the object detection apparatus 3 may be together regarded as means for controlling the degree of refining the candidate regions after the time point of determination.

[Third Embodiment]

This embodiment illustrates an object detection apparatus 3 which has almost the same configuration as the object detection apparatus 3 according to the first embodiment; accordingly, only the differences therebetween will be described hereinafter.

In the first embodiment, as described previously, the object detection apparatus 3 includes the first to the third identifiers. The time point of determination, at which the object detection apparatus 3 determines whether there is leeway in the processing time, is set to the time point at which the sub-process executed by the first identifier is completed. Moreover, according to the result of the determination as to whether there is leeway in the processing time, the object detection apparatus 3 sets the threshold TH to be used in the second identifier to either the first threshold TH1 or the second threshold TH2.

In comparison, in the present embodiment, the object detection apparatus 3 further includes a fourth identifier in addition to the first to the third identifiers. The time point of determination, at which the object detection apparatus 3 determines whether there is leeway in the processing time, is set to the time point at which the sub-process executed by the second identifier is completed. Moreover, according to the result of the determination as to whether there is leeway in the processing time, the object detection apparatus 3 further determines whether or not to use the third identifier to refine the candidate regions.

Figure 6:
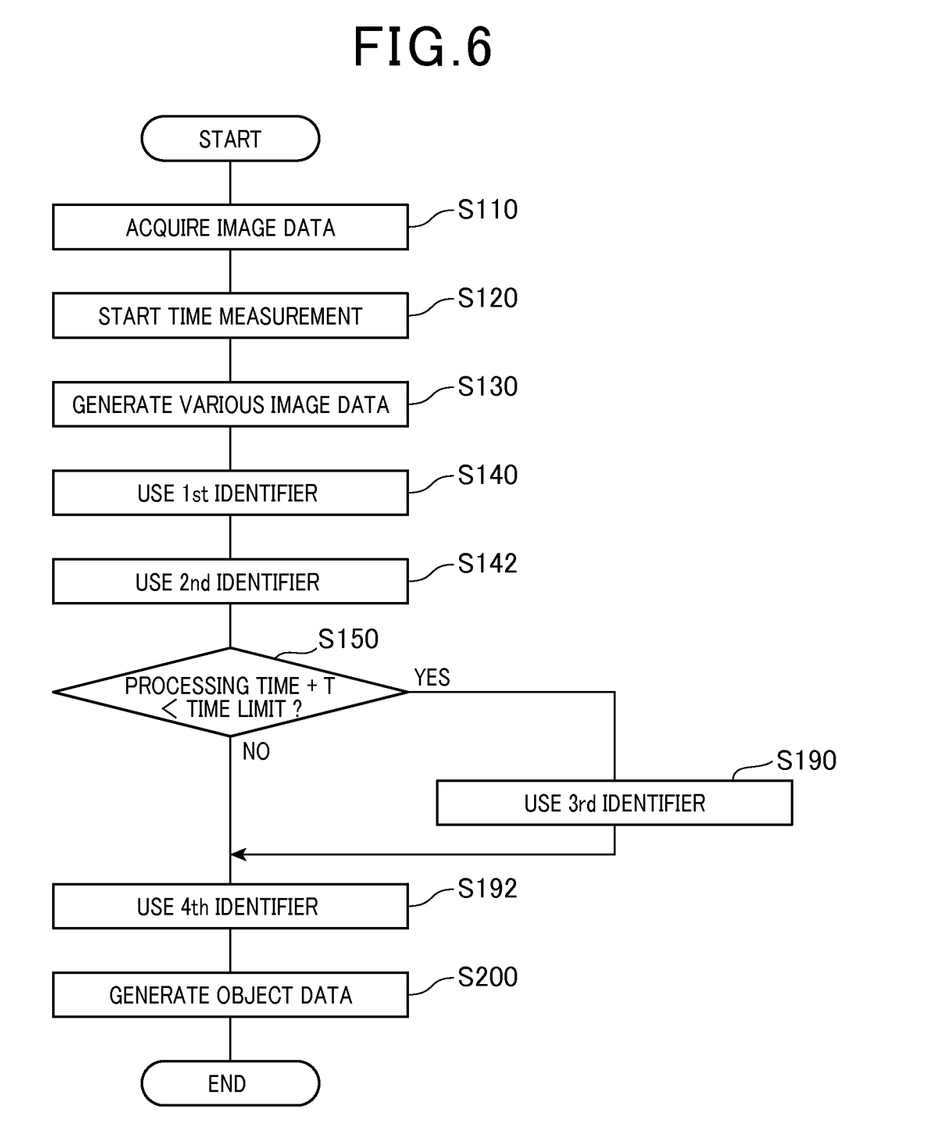
FIG. 6 is a flow chart illustrating a main process executed by an object detection apparatus according to a third embodiment.

FIG. 6 shows a main process of the object detection apparatus 3 according to the present embodiment.

In addition, compared to the main process described in the first embodiment with reference to FIG. 2, the main process shown in FIG. 6 includes steps S142 and S192 instead of steps S160-180.

In the present embodiment, upon activation of the main process shown in FIG. 6, first, at step S110, the object detection apparatus 3 acquires the image data outputted from the imaging device 2.

At step S120, the object detection apparatus 3 starts measurement of the processing time.

At step S130, the object detection apparatus 3 generates, based on the image data acquired at step S110, the first image data to the fourth image data which are to be respectively applied to the first to the fourth identifiers.

At step S140, the object detection apparatus 3 extracts candidate regions from the first image data by using the first identifier.

At step S142, the object detection apparatus 3 refines the candidate regions (or reduces the number of the candidate regions) by using the second identifier to process those image regions on the second image data which respectively correspond to the candidate regions extracted by the first identifier.

In addition, unlike in the first embodiment, a fixed threshold TH is used in the second identifier in the present embodiment.

At step S150, the object detection apparatus 3 determines whether a comparison time is shorter than a preset time limit. Here, the comparison time is equal to the sum of the processing time whose measurement is started at step S120 and a preset leeway time T.

If the comparison time is shorter than the time limit (S150: YES), in other words, if there is leeway in the processing time, the process proceeds to step S190.

At step S190, the object detection apparatus 3 further refines the candidate regions by using the third identifier to process those image regions on the third image data which respectively correspond to the candidate regions refined by the second identifier. Then, the process proceeds to step S192.

On the other hand, if the comparison time is longer than or equal to the time limit (S150: NO), in other words, if there is no leeway in the processing time, the process directly proceeds to step S192 skipping step S190.

At step S192, the object detection apparatus 3 further refines the candidate regions by using the fourth identifier to process those image regions on the fourth image data which respectively correspond to the candidate regions refined either by the second identifier at step S142 or by the third identifier at step S190. Then, the object detection apparatus 3 identifies those candidate regions which remain after the refinement by the fourth identifier as the object regions in which the object exists.

At step S200, the object detection apparatus 3 generates and outputs to the post-processing device 4 the object data which contains at least information about the position of the object. Here, the position of the object is represented by the positions of the object regions identified at step S192. Then, the process goes to the end.

The above-described object detection apparatus 3 according to the present embodiment has the following advantages.

In the present embodiment, the object detection apparatus 3 sets the time point of determination to the time point at which the sub-process (i.e., step S142) executed by the second identifier is completed. The object detection apparatus 3 determines, based on the processing time at the time point of determination, whether or not there is leeway of time in executing the remaining part of the main process after the time point of determination. When the result of the determination is negative, the object detection apparatus 3 further refines the candidate regions using only the fourth identifier. In contrast, when the result of the determination is positive, the object detection apparatus 3 further refines the candidate regions using both the third and fourth identifiers.

Figure 7A:
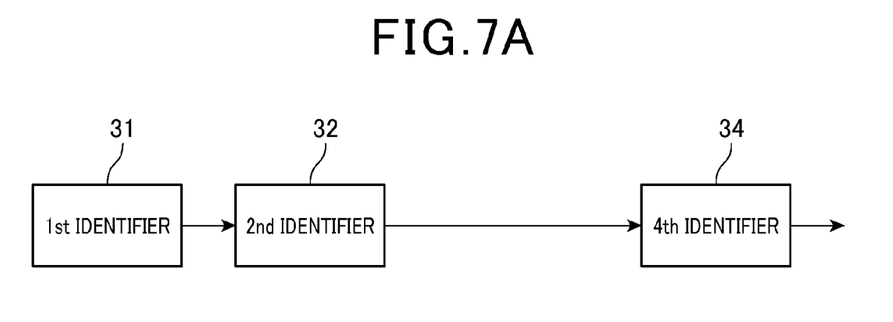
FIG. 7A is a schematic diagram illustrating the linkage established between identifiers of the object detection apparatus according to the third embodiment when there is no leeway in the processing time.

With the above configuration, when there is no leeway of time in executing the remaining part of the main process after the time point of determination, the main process is executed in a manner as illustrated in FIG. 7A, where only the first identifier 31, the second identifier 32 and the fourth identifier 34 are serially linked. Consequently, it is possible to sufficiently reduce the time for executing the remaining part of the main process after the time point of determination, thereby making it possible to complete the entire main process within a time limit.

Figure 7B:
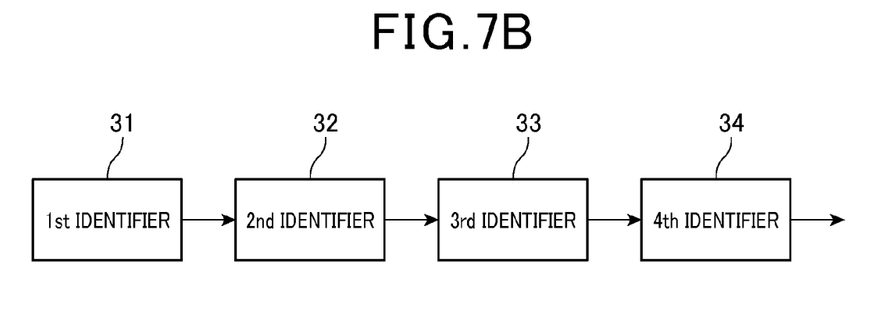
FIG. 7B is a schematic diagram illustrating the linkage established between the identifiers of the object detection apparatus according to the third embodiment when there is leeway in the processing time.

On the other hand, when there is leeway of time in executing the remaining part of the main process after the time point of determination, the main process is executed in a manner as illustrated in FIG. 7B, where all of the first to the fourth identifiers 31-34 are serially linked. Consequently, it is possible to effectively utilize the leeway of time, thereby making it possible to realize a thorough detection of the object.

To sum up, the object detection apparatus 3 according to the present embodiment can effectively detect the object with its detection performance adapted to the detection situation (or adjusted according to whether there is leeway in the processing time).

In addition, in the present embodiment, steps S150 and S190 of the main process of the object detection apparatus 3 may be together regarded as means for controlling the degree of refining the candidate regions after the time point of determination.

[Fourth Embodiment]

This embodiment illustrates an object detection apparatus 3 which has almost the same configuration as the object detection apparatus 3 according to the first embodiment; accordingly, only the differences therebetween will be described hereinafter.

In the first embodiment, as described previously, the object detection apparatus 3 includes the first to the third identifiers. The time point of determination, at which the object detection apparatus 3 determines whether there is leeway in the processing time, is set to the time point at which the sub-process executed by the first identifier is completed. Moreover, according to the result of the determination as to whether there is leeway in the processing time, the object detection apparatus 3 sets the threshold TH to be used in the second identifier to either the first threshold TH1 or the second threshold TH2.

In comparison, in the present embodiment, the object detection apparatus 3 further includes a fourth identifier in addition to the first to the third identifiers. The time point of determination, at which the object detection apparatus 3 determines whether there is leeway in the processing time, is set to the time point at which the sub-process executed by the first identifier is completed. Moreover, according to the result of the determination as to whether there is leeway in the processing time, the object detection apparatus 3 not only sets the threshold TH to be used in the second identifier to either the first threshold TH1 or the second threshold TH2, but also further determines whether or not to use the third identifier to refine the candidate regions.

Figure 8:
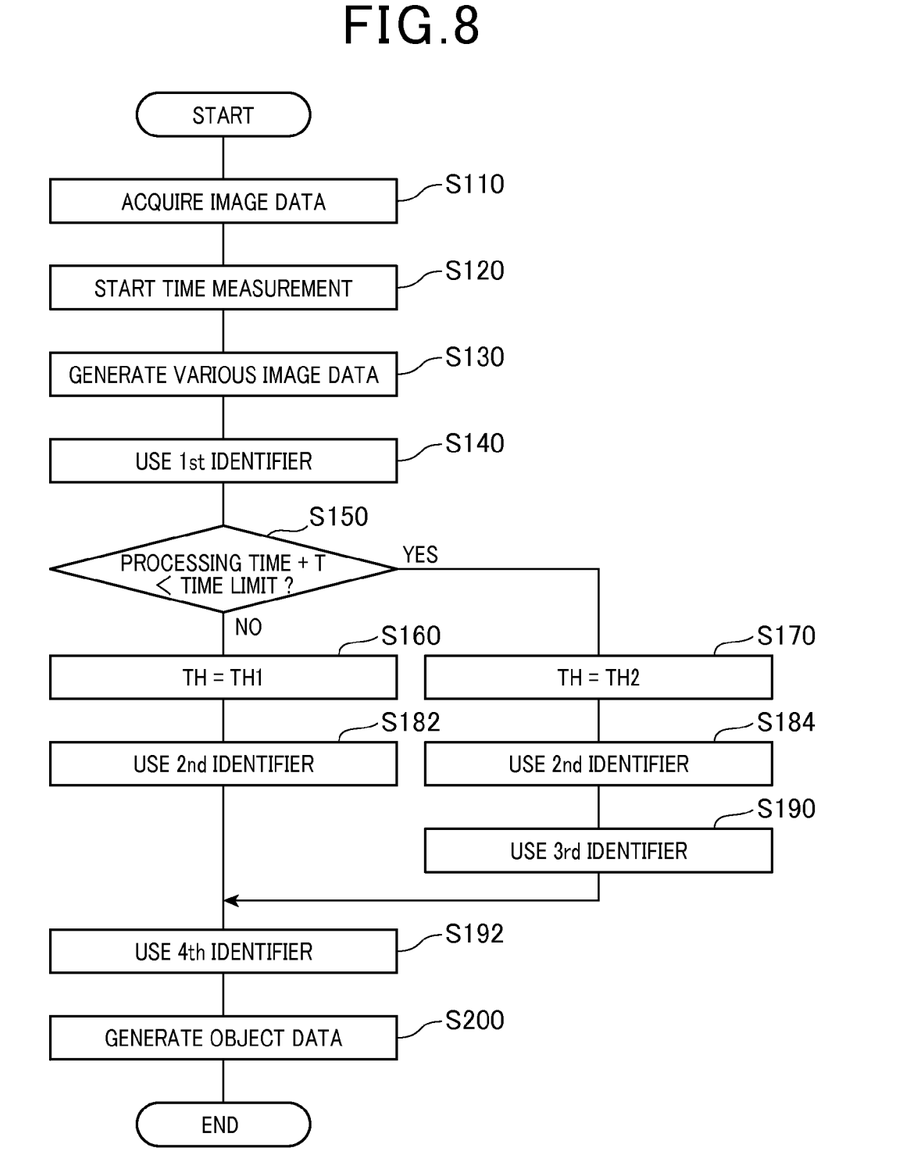
FIG. 8 is a flow chart illustrating a main process executed by an object detection apparatus according to a fourth embodiment.

FIG. 8 shows a main process of the object detection apparatus 3 according to the present embodiment.

In addition, compared to the main process described in the first embodiment with reference to FIG. 2, the main process shown in FIG. 8 includes steps S182 and S184 instead of step S180, and further includes additional step S192.

In the present embodiment, upon activation of the main process shown in FIG. 8, first, at step S110, the object detection apparatus 3 acquires the image data outputted from the imaging device 2.

At step S120, the object detection apparatus 3 starts measurement of the processing time.

At step S130, the object detection apparatus 3 generates, based on the image data acquired at step S110, the first image data to the fourth image data which are to be respectively applied to the first to the fourth identifiers.

At step S140, the object detection apparatus 3 extracts candidate regions from the first image data by using the first identifier.

At step S150, the object detection apparatus 3 determines whether a comparison time is shorter than a preset time limit. Here, the comparison time is equal to the sum of the processing time whose measurement is started at step S120 and a preset leeway time T.

If the comparison time is longer than or equal to the time limit (S150: NO), in other words, if there is no leeway in the processing time, the process proceeds to step S160.

At step S160, the object detection apparatus 3 sets a threshold TH to be used in the second identifier to a first threshold TH1. Then, the process proceeds to the step S182.

At step S182, the object detection apparatus 3 refines the candidate regions (or reduces the number of the candidate regions) by using the second identifier to process those image regions on the second image data which respectively correspond to the candidate regions extracted by the first identifier. Then, the process proceeds to step S192.

On the other hand, if the comparison time is shorter than the time limit (S150: YES), in other words, if there is leeway in the processing time, the process proceeds to step S170.

At step S170, the object detection apparatus 3 sets the threshold TH to be used in the second identifier to a second threshold TH2 that is lower than the first threshold TH1 (TH2<TH1). Then, the process proceeds to the step S184.

At step S184, the object detection apparatus 3 refines the candidate regions by using the second identifier to process those image regions on the second image data which respectively correspond to the candidate regions extracted by the first identifier.

At step S190, the object detection apparatus 3 further refines the candidate regions by using the third identifier to process those image regions on the third image data which respectively correspond to the candidate regions refined by the second identifier. Then, the process proceeds to step S192.

At step S192, the object detection apparatus 3 further refines the candidate regions by using the fourth identifier to process those image regions on the fourth image data which respectively correspond to the candidate regions refined either by the second identifier at step S182 or by the third identifier at step S190. Then, the object detection apparatus 3 identifies those candidate regions which remain after the refinement by the fourth identifier as the object regions in which the object exists.

At step S200, the object detection apparatus 3 generates and outputs to the post-processing device 4 the object data which contains at least information about the position of the object. Here, the position of the object is represented by the positions of the object regions identified at step S192. Then, the process goes to the end.

The above-described object detection apparatus 3 according to the present embodiment has the following advantages.

In the present embodiment, the object detection apparatus 3 sets the time point of determination to the time point at which the sub-process (i.e., step S140) executed by the first identifier is completed. The object detection apparatus 3 determines, based on the processing time at the time point of determination, whether or not there is leeway of time in executing the remaining part of the main process after the time point of determination. When the result of the determination is negative, the object detection apparatus 3 sets the threshold TH to be used in the second identifier to the first threshold TH1, and refines the candidate regions extracted by the first identifier using only the second and fourth identifiers. In contrast, when the result of the determination is positive, the object detection apparatus 3 sets the threshold TH to be used in the second identifier to the second threshold TH2 that is lower than the first threshold TH1, and refines the candidate regions extracted by the first identifier using all of the second, third and fourth identifiers.

Figure 9A:
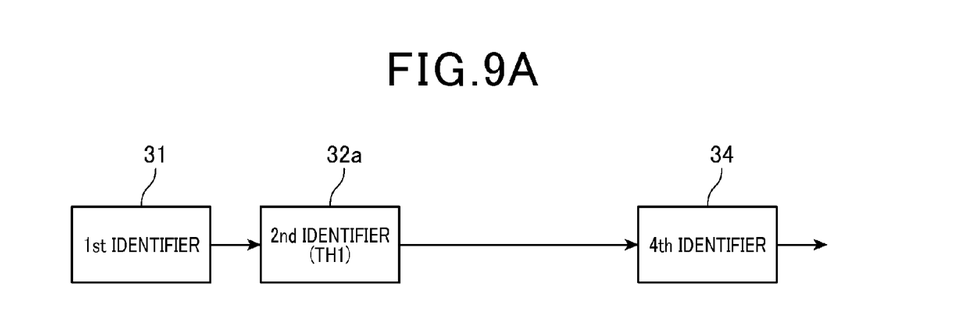
FIG. 9A is a schematic diagram illustrating the linkage established between identifiers of the object detection apparatus according to the fourth embodiment when there is no leeway in the processing time.

With the above configuration, when there is no leeway of time in executing the remaining part of the main process after the time point of determination, the main process is executed in a manner as illustrated in FIG. 9A, where only the first identifier 31, the second identifier 32a in which the first threshold TH1 is used, and the fourth identifier 34 are serially linked. Consequently, it is possible to sufficiently reduce the time for executing the remaining part of the main process after the time point of determination, thereby making it possible to complete the entire main process within a time limit.

Figure 9B:
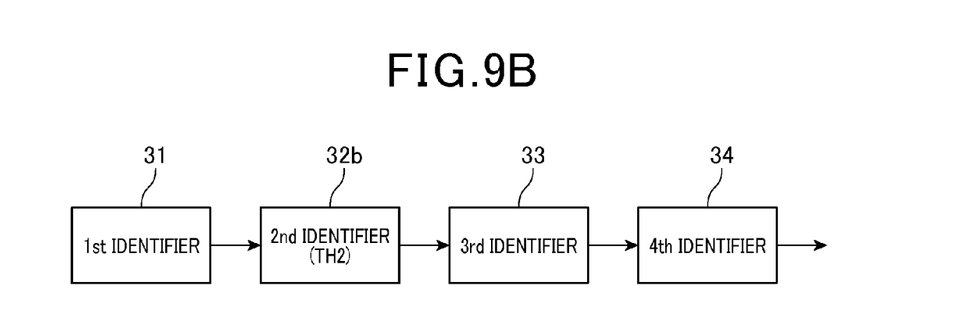
FIG. 9B is a schematic diagram illustrating the linkage established between the identifiers of the object detection apparatus according to the fourth embodiment when there is leeway in the processing time.

On the other hand, when there is leeway of time in executing the remaining part of the main process after the time point of determination, the main process is executed in a manner as illustrated in FIG. 9B, where all of the first identifier 31, the second identifier 32b in which the second threshold TH2 is used, the third identifier 33 and the fourth identifier 34 are serially linked. Consequently, it is possible to effectively utilize the leeway of time, thereby making it possible to realize a thorough detection of the object.

To sum up, the object detection apparatus 3 according to the present embodiment can effectively detect the object with its detection performance adapted to the detection situation (or adjusted according to whether there is leeway in the processing time).

In addition, in the present embodiment, steps S150-S170, S182-S184 and S190 of the main process of the object detection apparatus 3 may be together regarded as means for controlling the degree of refining the candidate regions after the time point of determination.

While the above particular embodiments have been shown and described, it will be understood by those skilled in the art that various modifications, changes, and improvements may be made without departing from the spirit of the present invention.

(1) In above-described embodiments, the leeway time T used at step S150 or step S272 is set to a fixed value.

However, the leeway time T may be varied according to, for example, the number of the objects (or the object regions) detected in the previous cycle of execution of the main process by the object detection apparatus 3. Specifically, when the number of the objects detected in the previous cycle is large, a lot of time may be needed for the post-processing device 4 to execute the post-process (e.g., tracking process). Therefore, in such a case, the leeway time T may be increased so as to secure a sufficient time for the post-processing 4 to execute the post-process.

In addition, the leeway time T may also be varied according to the time of day, the weather, the vehicle speed or the driving environment (or place) of the vehicle.

(2) In above-described embodiments, the object detection apparatus 3 determines whether there is leeway in the processing time only once at the single time point of determination.

However, the object detection apparatus 3 may determine whether there is leeway in the processing time by a plurality of times at different time points of determination. In this case, it is possible to more finely adjust the sub-processes of the identifiers and the linkage between the identifiers.

(3) Each element of the present invention is conceptual and not limited to the above-described embodiments. For example, a function performed by one element in the above-described embodiments may also be performed by a plurality of elements. In contrast, functions respectively performed by a plurality of elements in the above-described embodiments may also be performed by a single element.

Moreover, at least part of the configurations described in the above embodiments may be replaced with a well-known configuration having the same function. Furthermore, at least part of one of the configurations described in the above embodiments may be added to another one of the configurations or replace a part of another one of the configurations.

(4) In above-described embodiments, the present invention is embodied as the object detection apparatus 3.

However, the present invention may also be embodied in other manners, for example as a system which includes an object detection apparatus or as a computer program which causes a computer to function as an object detection apparatus.

What is claimed is:

1. A computer-readable medium having computer-executable instructions for detecting an object, comprising:
    acquiring image data from an in-vehicle imaging device, the in-vehicle imaging device being configured to image an environment of a vehicle and output the image data that is indicative of the imaged environment; and
    extracting an object region from the image data acquired, the object region being an image region where a preset object exists,
    wherein
    extracting the object region comprises:
        identifying the object region, wherein identifying the object region includes a plurality of identifiers for identifying candidate regions for the object region, the identifiers being serially linked so as to sequentially refine the candidate regions;
        measuring processing time for processing the image data acquired to identify the object region; and
        controlling, based on the measured processing time at a preset time point, a degree to which the candidate regions are refined after the preset time point, by adjusting at least one of a linkage between the identifiers and processes to be executed by the identifiers after the preset time point.

2. The computer-readable medium as set forth in claim 1, wherein the degree of refining the candidate regions is controlled so that the longer the measured processing time at the preset time point, the more the degree of refining the candidate regions is increased after the preset time point.

3. The computer-readable medium as set forth in claim 1, wherein each of the identifiers is configured to calculate, for each of image regions inputted to the identifier, a score which represents a probability of the object existing in the image region, and identify the image region as one of the candidate regions when the calculated score is higher than a threshold, and the degree of refining the candidate regions is controlled by adjusting at least one of the thresholds of the identifiers to be used after the preset time point.

4. The computer-readable medium as set forth in claim 3, wherein the at least one of the thresholds of the identifiers to be used is adjusted after the preset time point so that the longer the measured processing time at the preset time point, the higher the at least one of the thresholds to be used after the preset time point.

5. The computer-readable medium as set forth in claim 1, wherein at least one of the identifiers is configured to:
    calculate, for each of image regions inputted to the identifier, a score which represents a probability of the object existing in the image region;
    register the image region, as one of the candidate regions, in a first candidate set when the calculated score is higher than a preset first threshold;
    register the image region, as one of the candidate regions, in a second candidate set when the calculated score is higher than a preset second threshold that is lower than the first threshold; and
    select one of the first and second candidate sets and output the candidate regions registered in the selected candidate set,
    wherein
    the preset time point is a time point at which all the registrations of the image regions in the first and second candidate sets are completed in the at least one of the identifiers, and
    the degree of refining the candidate regions is controlled by causing the at least one of the identifiers to select the first candidate set when the measured processing time at the preset time point is longer than or equal to a preset time limit and to select the second candidate set when the measured processing time at the preset time point is shorter than the preset time limit.

6. The computer-readable medium as set forth in claim 1, wherein the degree of refining the candidate regions is controlled by adjusting the number or types of the identifiers to be used after the preset time point.

7. A method of detecting an object comprising:
    acquiring image data from an in-vehicle imaging device, the in-vehicle imaging device being configured to image an environment of a vehicle and output the image data that is indicative of the imaged environment; and
    extracting an object region from the image data acquired, the object region being an image region where a preset object exists,
    wherein extracting the object region comprises:
        identifying the object region using a plurality of identifiers for identifying candidate regions for the object region, the identifiers being serially linked so as to sequentially refine the candidate regions;
        measuring processing time for processing the image data acquired to identify the object region; and
        controlling, based on the measured processing time at a preset time point, a degree to which the candidate regions are refined after the preset time point by adjusting at least one of a linkage between the identifiers and processes to be executed by the identifiers after the preset time point.

8. The method as set forth in claim 7, wherein the degree of refining the candidate regions is controlled so that the longer the measured processing time at the preset time point, the more the degree of refining the candidate regions is increased after the preset time point.

9. The method as set forth in claim 7, wherein
each of the identifiers is configured to calculate, for each of image regions inputted to the identifier, a score which represents a probability of the object existing in the image region, and identify the image region as one of the candidate regions when the calculated score is higher than a threshold, and
the degree of refining the candidate regions is controlled by adjusting at least one of the thresholds of the identifiers to be used after the preset time point.

10. The method as set forth in claim 9, wherein the at least one of the thresholds of the identifiers to be used after the preset time point is adjusted so that the longer the measured processing time at the preset time point, the higher the at least one of the thresholds to be used after the preset time point.

11. The method as set forth in claim 7, wherein at least one of the identifiers is configured to:
calculate, for each of image regions inputted to the identifier, a score which represents a probability of the object existing in the image region;
register the image region, as one of the candidate regions, in a first candidate set when the calculated score is higher than a preset first threshold;
register the image region, as one of the candidate regions, in a second candidate set when the calculated score is higher than a preset second threshold that is lower than the first threshold; and
select one of the first and second candidate sets and output the candidate regions registered in the selected candidate set,
wherein
the preset time point is a time point at which all the registrations of the image regions in the first and second candidate sets are completed in the at least one of the identifiers, and
the degree of refining the candidate regions is controlled by causing the at least one of the identifiers to select the first candidate set when the measured processing time at the preset time point is longer than or equal to a preset time limit and to select the second candidate set when the measured processing time at the preset time point is shorter than the preset time limit.

12. The method as set forth in claim 7, wherein the degree of refining the candidate regions is controlled by adjusting the number or types of the identifiers to be used after the preset time point.

13. A system for detecting an object comprising:
a computer; and
a computer program which causes the computer to:
acquire image data from an in-vehicle imaging device, the in-vehicle imaging device being configured to image an environment of a vehicle and output the image data that is indicative of the imaged environment; and
extract an object region from the image data acquired, the object region being an image region where a preset object exists,
wherein extracting the object region causes the computer to:
identify the object region using a plurality of identifiers for identifying candidate regions for the object region, the identifiers being serially linked so as to sequentially refine the candidate regions;
measure processing time for processing the image data acquired to identify the object region; and
control, based on the measured processing time at a preset time point, a degree to which the candidate regions are refined after the preset time point by adjusting at least one of a linkage between the identifiers and processes to be executed by the identifiers after the preset time point.

14. The system as set forth in claim 13, wherein the degree of refining the candidate regions is controlled so that the longer the measured processing time at the preset time point, the more the degree of refining the candidate regions is increased after the preset time point.

15. The system as set forth in claim 13, wherein
each of the identifiers is configured to calculate, for each of image regions inputted to the identifier, a score which represents a probability of the object existing in the image region, and identify the image region as one of the candidate regions when the calculated score is higher than a threshold, and
the degree of refining the candidate regions is controlled by adjusting at least one of the thresholds of the identifiers to be used after the preset time point.

16. The system as set forth in claim 15, wherein the at least one of the thresholds of the identifiers to be used after the preset time point is adjusted so that the longer the measured processing time at the preset time point, the higher the at least one of the thresholds to be used after the preset time point.

17. The system as set forth in claim 13, wherein at least one of the identifiers is configured to:
calculate, for each of image regions inputted to the identifier, a score which represents a probability of the object existing in the image region;
register the image region, as one of the candidate regions, in a first candidate set when the calculated score is higher than a preset first threshold;
register the image region, as one of the candidate regions, in a second candidate set when the calculated score is higher than a preset second threshold that is lower than the first threshold; and
select one of the first and second candidate sets and output the candidate regions registered in the selected candidate set,
wherein
the preset time point is a time point at which all the registrations of the image regions in the first and second candidate sets are completed in the at least one of the identifiers, and
the degree of refining the candidate regions is controlled by causing the at least one of the identifiers to select the first candidate set when the measured processing time at the preset time point is longer than or equal to a preset time limit and to select the second candidate set when the measured processing time at the preset time point is shorter than the preset time limit.

18. The system as set forth in claim 13, wherein the degree of refining the candidate regions is controlled by adjusting the number or types of the identifiers to be used after the preset time point.

* * * * *